(12) United States Patent
Ayoub et al.

(10) Patent No.: US 10,799,061 B2
(45) Date of Patent: Oct. 13, 2020

(54) BEVERAGE PREPARATION MACHINE WITH SINGLE MOTOR ACTUATION

(71) Applicant: NESTEC S.A., Vevey (CH)

(72) Inventors: Michael Ayoub, Crissier (CH); Reto Markus Zurcher, Herisau (CH); Roland Lehmann, Herisau (CH); Alexander Heinrich, Benken (CH); Martin Gadient, Bichelsee (CH); Manuel Widmer, Wil (CH)

(73) Assignee: Societe des Produits Nestle S.A., Vevey (CH)

(*) Notice: Subject to any disclaimer, the term of this patent is extended or adjusted under 35 U.S.C. 154(b) by 315 days.

(21) Appl. No.: 15/752,083

(22) PCT Filed: Jul. 19, 2016

(86) PCT No.: PCT/EP2016/067164
§ 371 (c)(1),
(2) Date: Feb. 12, 2018

(87) PCT Pub. No.: WO2017/029050
PCT Pub. Date: Feb. 23, 2017

(65) Prior Publication Data
US 2018/0271317 A1    Sep. 27, 2018

(30) Foreign Application Priority Data

Aug. 14, 2015  (EP) .................... 15181047

(51) Int. Cl.
*A47J 31/46*  (2006.01)
*A47J 31/36*  (2006.01)

(52) U.S. Cl.
CPC ............ *A47J 31/46* (2013.01); *A47J 31/369* (2013.01)

(58) Field of Classification Search
CPC .. A47J 31/0642; A47J 31/0668; A47J 31/369; A47J 31/46; A47J 31/461
See application file for complete search history.

(56) References Cited

U.S. PATENT DOCUMENTS

| | | | | |
|---|---|---|---|---|
| 3,861,421 A * | 1/1975 | Thompson | ................ | F16K 7/06 |
| | | | | 137/636.4 |
| 4,136,202 A | 1/1979 | Favre | | |
| 4,846,052 A | 7/1989 | Favre et al. | | |
| 8,359,968 B2 * | 1/2013 | Denisart | ................ | F16K 11/027 |
| | | | | 99/280 |
| 8,512,784 B2 * | 8/2013 | Denisart | ................. | A47J 31/22 |
| | | | | 426/433 |
| 2003/0066431 A1 * | 4/2003 | Fanzutti | ................ | A47J 31/545 |
| | | | | 99/279 |

(Continued)

FOREIGN PATENT DOCUMENTS

| | | |
|---|---|---|
| EP | 1472156 | 3/2006 |
| EP | 1784344 | 4/2009 |

(Continued)

*Primary Examiner* — Christopher M Koehler
*Assistant Examiner* — Kyle A Cook
(74) *Attorney, Agent, or Firm* — K&L Gates LLP

(57) ABSTRACT

The present invention concerns a brewing unit (5) for a beverage preparation machine (1), having several automated functionalities actuated by one single motor (16). The invention also concerns a beverage preparation machine comprising such an automated brewing unit.

16 Claims, 9 Drawing Sheets

(56) References Cited

U.S. PATENT DOCUMENTS

| | | |
|---|---|---|
| 2003/0071056 A1 | 4/2003 | Hale |
| 2013/0115342 A1* | 5/2013 | Van Os .................. A47J 42/50 |
| | | 426/231 |
| 2013/0276638 A1* | 10/2013 | Kristlbauer ......... A47J 31/3633 |
| | | 99/295 |
| 2016/0107831 A1* | 4/2016 | Talon ................ B65D 85/8043 |
| | | 426/115 |
| 2018/0078086 A1* | 3/2018 | Affolter ................ A47J 31/461 |

FOREIGN PATENT DOCUMENTS

| | | |
|---|---|---|
| WO | 2006126230 | 11/2006 |
| WO | 2006127118 | 11/2006 |
| WO | 2008138820 | 11/2008 |
| WO | 2009069167 | 6/2009 |

\* cited by examiner

BEVERAGE PREPARATION MACHINE WITH SINGLE MOTOR ACTUATION

CROSS REFERENCE TO RELATED APPLICATIONS

The present application is a National Stage of International Application No. PCT/EP2016/067164, filed on Jul. 19, 2016, which claims priority to European Patent Application No. 15181047.0, filed on Aug. 14, 2015, the entire contents of which are being incorporated herein by reference.

FIELD OF THE INVENTION

The present invention concerns a brewing unit for a beverage preparation machine, having several automated functionalities actuated by one single motor.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working with a rigid or semi-rigid capsule.

The machine comprises a receptacle or cavity for accommodating said capsule and a fluid injection system for injecting a fluid, preferably water, under pressure into the capsule. Water injected under pressure in the capsule, for the preparation of a coffee beverage according to the present invention, is preferably hot, that is to say at a temperature above 70° C. However, in some particular instances, it might also be at ambient temperature, or even chilled. The pressure inside the capsule chamber during extraction and/or dissolution of the capsule contents is typically about 1 to about 8 bar for dissolution products and about 2 to about 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee, within a few seconds.

The principle of extracting and/or dissolving the contents of a closed capsule under pressure is known, and consists typically of inserting the capsule in a receptacle or cavity of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patents n° EP 1472156 B1, and EP 1784344 B1.

Machines allowing the application of this principle have already been described for example in patents CH 605 293 and EP 242 556. According to these documents, the machine comprises a receptacle or cavity for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is e.g. selected via a selecting valve means, such as for instance a peristaltic valve of the type described in applicant's European patent application EP 2162653 A1.

When the beverage to be prepared is coffee, one interesting way to prepare the coffee is to provide the consumer with a capsule containing roast and ground coffee powder, which is to be extracted with hot water injected therein.

In many instances, the machine comprises a capsule holder for holding a capsule, which is intended to be inserted in and removed from a corresponding cavity or receptacle of the machine. When a capsule holder is loaded with a capsule and inserted within the machine in a functional manner, the water injection means of the machine can fluidly connect to the capsule to inject water therein for a food preparation, as described above. A capsule holder was described for example in applicant's European patent EP 1967100 B1.

Capsules have been developed for such an application of food preparation, and in particular for beverage preparation, which are described and claimed in applicant's European patent EP 1784344 B1, or in European patent application EP 2062831.

The actuation of the movable parts of the beverage machines is generally manual, i.e. actuated by means of levers or buttons pivoted or pressed by the user, so as to actuate the related functions. For instance, the Applicant's European patent EP 2071987 B1 describes how a user pivots a lever to open or close the brewing cavity of the machine when an ingredient capsule is to be inserted (or withdrawn) therein. Also, European patent EP 2162653 B1 discloses how the water selection valve of a beverage machine is actuated between its closed, "hot water" or "cold water" selections by pivoting a lever. Such machine constructions are reliable and inexpensive to manufacture.

However, more user-friendly solutions were developed as automatic or semi-automatic beverage machines, wherein at least some of the movable parts in the machine are actuated by means of dedicated electric motors, which displace the functional parts according to their respective function. In semi-automatic machines, at least part of the actuation of movable elements of the machine is performed by motors, whereas in full automatic machines, the user presses a button or a similar on/off switch, which triggers a sequence of operation of the different motors in the machine that operate all functions necessary to the preparation of a beverage (actuation of water pump, valves, water heater, water injection means to the ingredient, and the like, and/or withdrawal of the ingredient from the brewing cavity of the machine, and any other function that requires moving a functional element of said machine).

For instance, British patent GB 812833 discloses a machine for making coffee and like beverages, that comprises a container for the coffee grounds or the like through which a quantity of water is discharged to make an infusion, a mechanism for securing and releasing the mouth of the container to and from the infusing mechanism and a mechanism for moving the container relatively to the infusing mechanism, these mechanisms being operable in a predetermined sequence by cam-controlled servomotors comprising cylinders in which pistons are displaced by a fluid. Such a beverage machine is advantageous in that the ability and the force of the user are not necessary to operate the machine and prepare a beverage. However, such automatic or semi-automatic machines are expensive and complex because each movable part of the machine is actuated by a separate motor. Furthermore, the more motors in a machine, the more electricity needed, which renders the whole beverage machine expensive to operate, and not ecological.

It is therefore an objective of the present invention to provide a beverage machine that obviates the disadvantages of known semi-automatic or automatic machines.

SUMMARY OF THE INVENTION

The objectives set out above are met with a brewing unit for a beverage preparation machine comprising a plurality of cavity parts forming together a cavity for receiving an ingredient, at least one of said cavity parts being movable in translation relative to the other(s) to open or close said cavity, said brewing unit comprising injection means for injecting into the cavity a fluid distributed through pipes from two alternative fluid sources located in the machine, said fluid for mixing with said ingredient and producing a beverage, characterized in that it further comprises:
(i) a motor having an output shaft,
(ii) a screw shaft fixed to the movable cavity part at a proximal end,
(iii) a screw nut movable in rotation along a thread path of the screw shaft in a translation shaft arrangement, said screw nut being mechanically linked to the motor output shaft such that when said nut is rotated by the motor, it imparts a translation movement to said screw shaft and movable cavity part relative to the rest of the brewing unit, said screw nut comprising a protrusion or groove extending from, respectively into, its peripheral edge, (iv) a peristaltic fluid valve for conducting or blocking one or another fluid from the machine towards said injection means through two flexible pipes corresponding to each of the two fluid sources, said peristaltic valve comprising two modules, each of which is adapted around a flexible pipe and comprises a mobile jaw for pinching the corresponding pipe, said module having a closing rocker body for pressing said jaw onto the pipe and closing the latter when pressed in a direction substantially parallel to the screw shaft, said module further having an opening rocker body for moving said jaw from said pipe when pressed in a direction substantially parallel to the screw shaft,
(v) a preselector comprising:
a rigid element pivotable between two angular positions and comprising first and second actuating pins, each pin extending towards a valve module such that in the first position of the preselector the first actuating pin overlaps the opening rocker body of the first module in a plane perpendicular to the screw shaft while the second actuating pin overlaps the closing rocker body of the second module in a plane perpendicular to the screw shaft, and in the second position of the preselector the first actuating pin overlaps the closing rocker body of the first module in a plane perpendicular to the screw shaft while the second actuating pin overlaps the opening rocker body of the second module in a plane perpendicular to the screw shaft,
a flexible tongue extending from the surface of said rigid element so as to catch the screw nut protrusion or groove at a point along the thread path that is distant from the extremities of said path by at least $\frac{1}{16}$th of a nut rotation to form a reversible ratchet arrangement, the ratchet force being sufficient for pivoting the preselector element between its two angular positions, but insufficient for stopping the rotation of the screw nut further along the screw shaft during its rotation.

In a highly preferred embodiment of the invention, the brewing unit further comprises an encoder wheel and a sensor mechanically linked to the output shaft of the motor, for detecting the exact angular position of the screw nut along the screw shaft. Such a mechanism allows to finely determine the position of the different movable parts of the brewing unit, in particular the position of the nut across the screw shaft. Depending on the position of the screw nut, the state of the fluid valve (closed, selection of "hot" water, selection of "cold/ambient" water).

The output shaft of the motor and the screw nut can be mechanically linked through a belt assembly, or alternatively through a gear shaft assembly.

In the latter case, the gear shaft assembly preferably comprises at least a motor gear wheel fixed to the motor output shaft, and a drive gear wheel fixed to the screw shaft, the motor gear wheel being smaller than the screw shaft gear wheel, in a ratio comprised between.

Furthermore, the mechanical transmission advantageously further comprises a speed reduction gear wheel intermediate between the motor gear wheel and the drive gear wheel.

In any case, the catch point between the preselector tongue and the protrusion or groove of the screw nut, is preferably located at a distance comprised between $\frac{1}{16}^{th}$ and $\frac{1}{4}^{th}$ of a nut rotation, from the proximal extremity of the screw shaft. This allows the screw nut to continue its rotation further after said screw nut has caught the preselector tongue and driven said preselector in rotation to one of its two positions, such that by rotating further, the screw nut can separate (i.e. unhook) easily from the tongue of the preselector, and rotate further so that the movable cavity part can also move further in one or the other direction.

In a preferred embodiment of the invention, the position detection wheel is a light barrier gear wheel with increment teeth.

Furthermore, in one possible embodiment, the brewing unit according to the invention is detachable from the beverage preparation machine body. That is to say, the whole brewing unit—defined as the cavities able to receive and enclose an ingredient during brewing so that a beverage can be prepared from said ingredient, together with the system for opening and closing said cavities—can be detached from the rest of the beverage preparation machine (the fluid system as defined in detail hereafter, the electric circuit, the water tank is any).

Advantageously, the beverage ingredient is contained in a single-dose disposable package such as a sachet, a soft pad, or a rigid or semi-rigid capsule.

Preferably, one of the two fluid sources is cold/ambient water drawn from a reservoir of the machine, and the other is hot water drawn from the same reservoir and treated through a heater.

Furthermore, the jaw of each peristaltic fluid module is preferably spring-mounted such that when no pressure is applied to the rocker bodies, said jaw presses onto the corresponding pipe sufficiently to prevent fluid circulation therethrough, if the fluid pressure within said pipe is below a predetermined safety pressure lower than 3 bar, preferably lower than 2 bar.

The preselector element is preferably pivotable between two angular position around an axis parallel to, or coaxial with, the screw shaft longitudinal axis (SL). Preferably, the two positions of the preselector are distant from one another by pivoting said preselector around its rotation axis of an angle comprised between 3° and 45°, preferably an angle comprised between 5° and 20°. Advantageously, the rotation axis of the preselector is merged with the longitudinal axis of the screw shaft. Furthermore, the preselector also advantageously comprises a ratchet so that no intermediate position can be achieved by the preselector apart from the two angular positions described before.

The present invention is also more generally directed to a beverage preparation machine comprising a brewing unit as described above.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

In the field of the present invention, suitable gears can be of the spur gear type, but can also be external gears, helical or double helical gears, skew gears, bevel or spiral bevel gears, hypoid gears, worm gears, epicyclic or sun and planet gears, harmonic, cage, or magnetic gears, or a combination thereof.

By "cold" water, it is meant water that is at a temperature equal to, or lower than ambient temperature, i.e. that is distributed without prior heating treatment through a water heating element. Preferably, such temperature is comprised within the range of 1° C. to 30° C., more preferably, comprised within 4° C. to 20° C.

Figure 1:
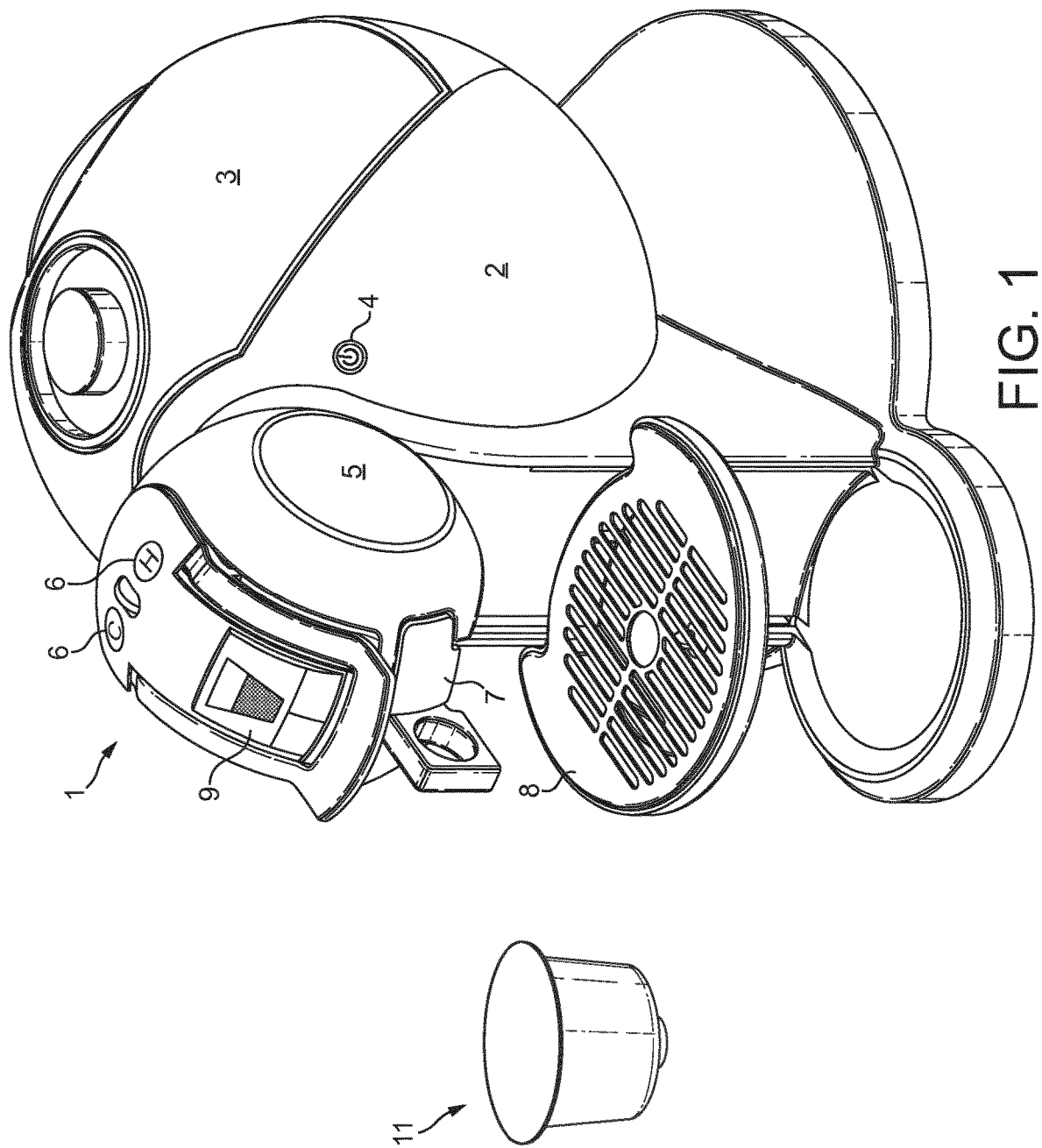
FIG. 1 is schematic perspective view of a beverage preparation machine according to the invention.

The brewing unit according to the present invention is meant to be used in fluid and electrical connection to the base of a beverage preparation machine illustrated in FIG. 1, thus forming a whole functional beverage preparation machine. The brewing unit can be an integral part of the machine (i.e. not removable therefrom without a complex, and possibly destructive operation), or alternatively, said brewing unit can be designed as a detachable part from the beverage machine base. One possible embodiment of such a machine is schematically described hereafter with reference to FIG. 1. Furthermore, in the embodiments described hereafter, it is assumed that the beverage precursor ingredient is contained in a rigid or semi rigid capsule, for instance of the type described in the Applicant's European patent EP 1472156 B1.

As shown in FIG. 1, the machine 1 comprises a machine body 2, a water reservoir 3 that can be removed from the machine body 2 for refill. The body 2 comprises an on/off push button 4. The machine 1 further comprises an brewing unit 5 that is fixed to the body 2 of the machine. The brewing unit 5 comprises a water temperature selector for hot or cold water taking the form of two buttons 6 (one for selecting a hot beverage, the other for cold), and an opening for insertion of a capsule holder 7. The machine 1 further comprises a cup tray 8, for holding a cup under the brewing unit dispensing outlet. The machine further comprises a control panel 9 for selecting a beverage preparation parameter, typically for instance the volume of beverage to be dispensed. The control panel can comprising a selector wheel as shown in FIG. 1, or alternatively a tactile panel (i.e. a touch screen). The capsule holder 7 is adapted to receive an ingredient capsule 11.

Figure 2:
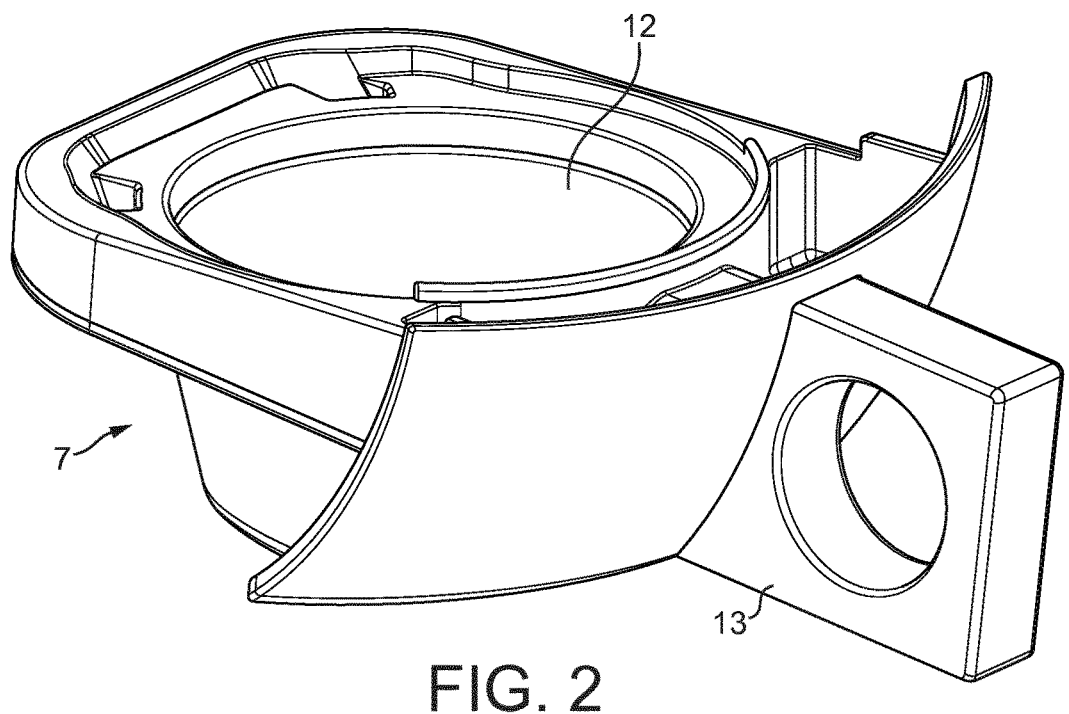
FIG. 2 is an enlarged perspective view of a capsule holder of a brewing unit according to the invention.

The capsule holder 7 is represented in FIG. 2, when detached from the rest of the brewing unit. It comprises a cavity part 12 for inserting an ingredient capsule 11 therein before insertion of the capsule holder 7 inside the brewing unit 5 of the machine 1. The capsule holder 7 further comprises a handle 13 which preferably, but not necessarily, protrudes from the boundaries of the machine 1 when the capsule holder is inserted therein as illustrated in FIG. 1. The capsule holder serves to hold the ingredient capsule and maintain the physical integrity of the latter during brewing of a beverage. As an example, as fluid is injected within the capsule during a brewing process, fluid pressure inside the capsule may increase to several bar, which may damage the capsule. By holding the capsule walls, the capsule holder ensures that the capsule walls are not damage by internal pressure increase.

In the rest of the description, explanations will focus on the brewing unit part of the machine.

The brewing unit according to the invention comprises an assembly of mechanically linked elements which cooperate to automatically actuate opening and closing of the brewing unit, but also cooperate to automatically select the appropriate fluid circulation from the machine pump towards an ingredient capsule inserted within the capsule holder, according to the selection that is made by the user through the hot/cold selection buttons 6.

Figure 3:
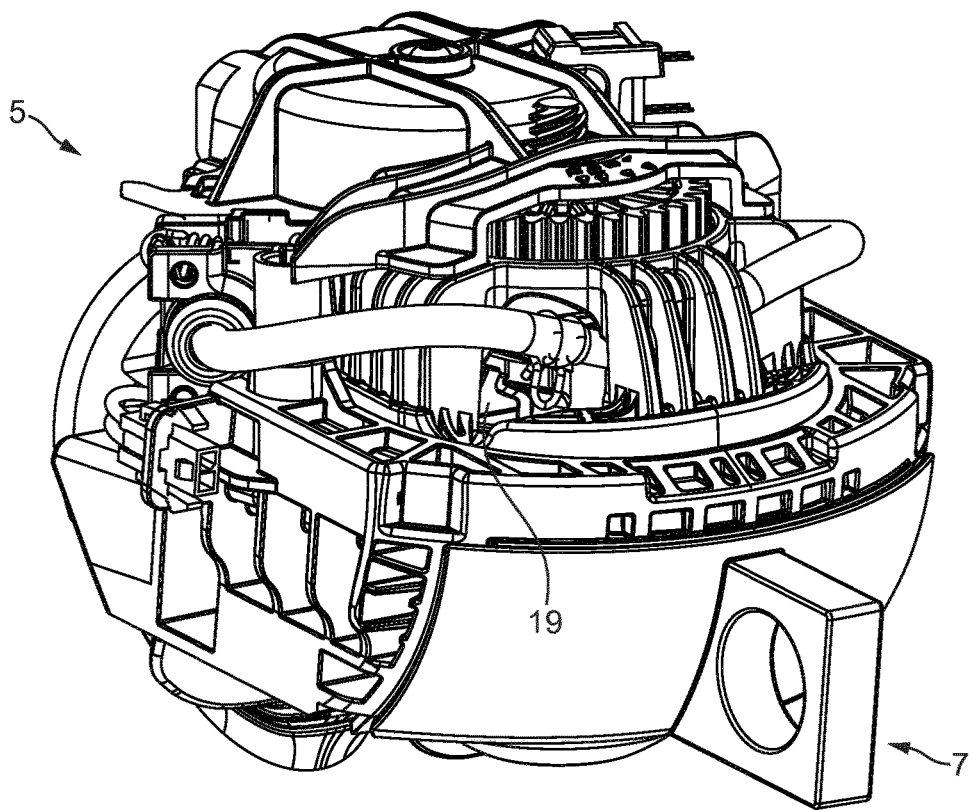
FIG. 3 is an enlarged perspective view of a brewing unit according to the invention, without the external casing, hence illustrating the arrangement of its constitutive elements.
Figure 4:
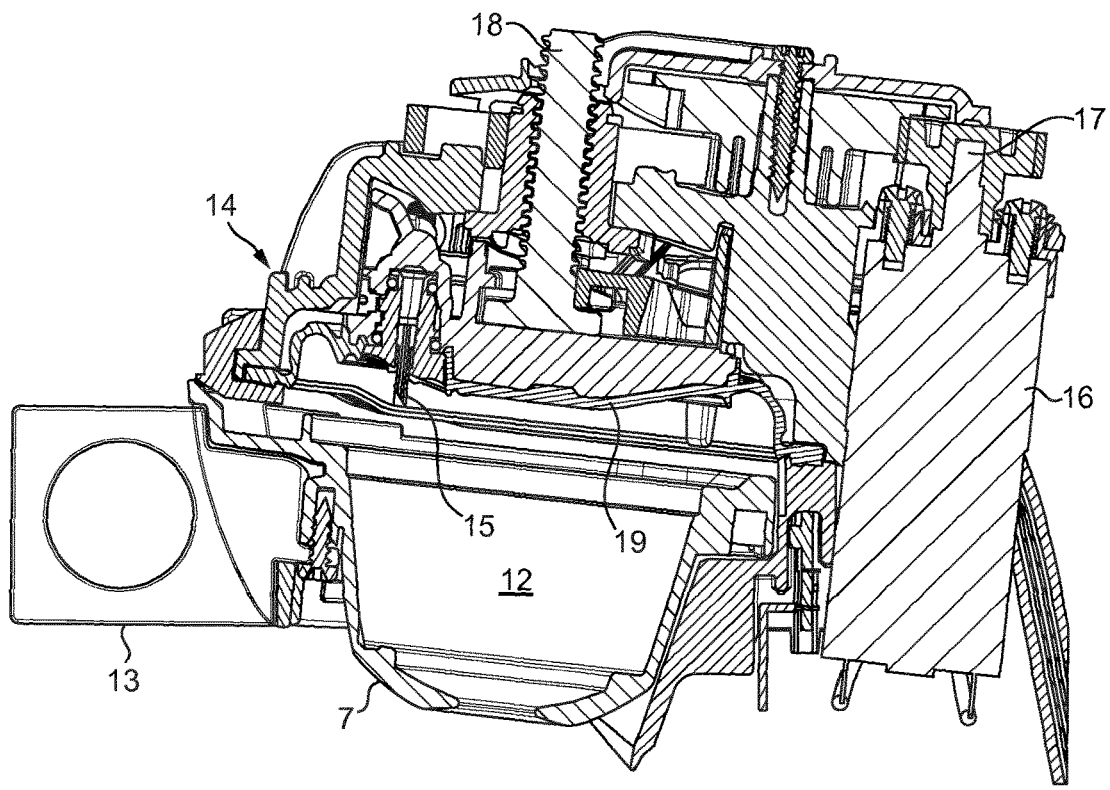
FIG. 4 is a cut view along the plane A-A of FIG. 3.

The brewing unit 5 according to the invention is illustrated in FIGS. 3 and 4, in its fully assembled state, with a capsule holder 7 inserted therein. In these FIGS. 3 and 4, the outer casing of the machine is removed so that the constitutive elements of the brewing unit are visible.

Figure 5:
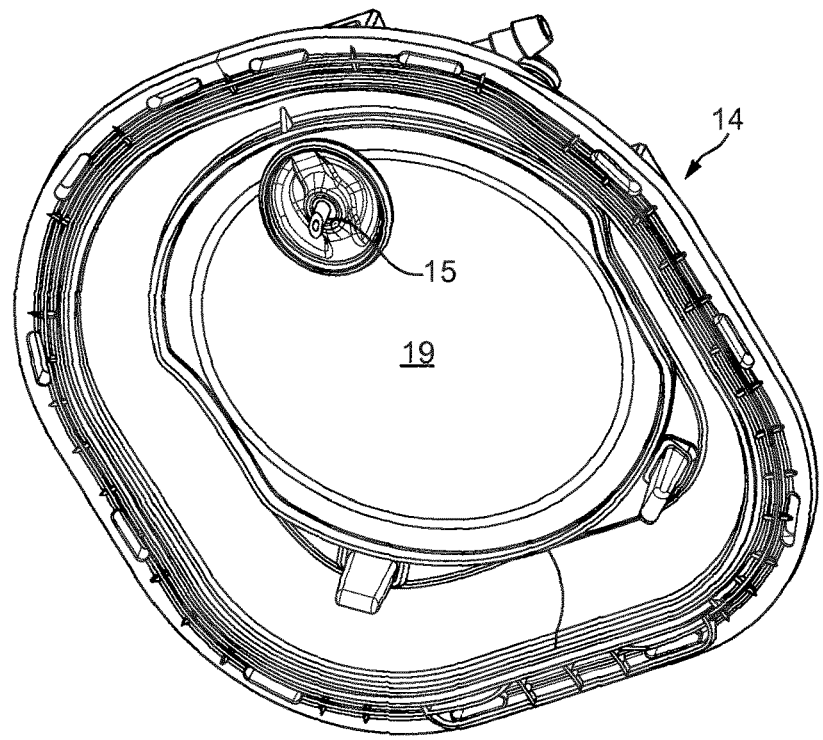
FIG. 5 is a perspective bottom view of a needle plate in a brewing unit according to the invention.

The brewing unit comprises a pair of cavity parts forming together a cavity for receiving an ingredient capsule. In the embodiment described herein and illustrated in FIG. 4, the lower cavity part of the machine is the capsule holder 7. However the lower cavity part could be a cavity able to receive at least a portion of a capsule or other ingredient package, and which is integrated to the rest of the brewing unit, as a non-detachable part, or only partially detachable (i.e. movable or pivotable) part. The upper cavity part 14 illustrated in FIGS. 4 and 5, is movable in translation relative to the capsule holder (which in this particular embodiment is stationery once fully inserted in the dedicated receptacle of the brewing unit), so as to open or close said cavity.

Figure 6:
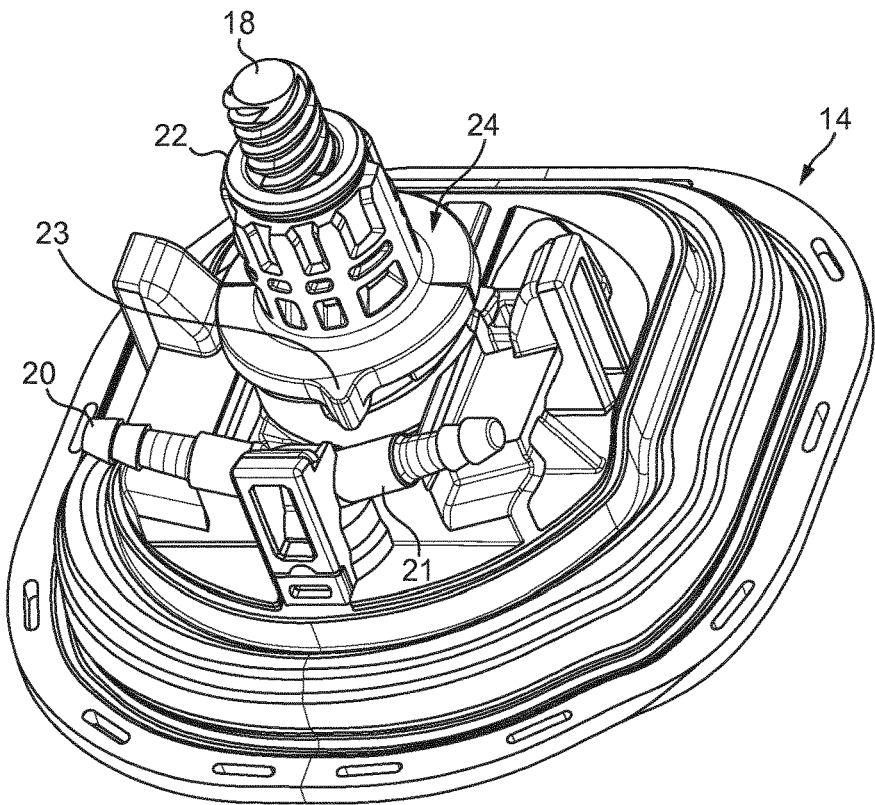
FIG. 6 is a perspective top view of a needle plate in a brewing unit according to the invention.

The brewing unit further comprises injection means for injecting into the capsule a fluid distributed through pipes from two alternative fluid sources located in the machine. The injection means comprise a water injection needle 15. Once injected into the capsule, said fluid mixes with the ingredient contained in the capsule, so as to produce a beverage that is then dispensed out of the capsule into a cup or similar container located below a dispensing opening of the capsule. The first fluid source is water pumped from the water reservoir directly and conducted towards the fluid injection needle 15. The second source of fluid is water pumped from the water reservoir, but which passes through a water heating element (not illustrated) such that heated water is injected into the capsule (or other ingredient package) held in the brewing unit cavity, through the water injection needle 15. The movable upper cavity part is also illustrated in FIG. 6 which is a top perspective view. In this figure, it can be seen that the upper cavity part comprises a water connector 20 for connecting a cold water pipe, and a water connector 21 for connecting a hot water pipe. Both connectors 20 and 21 are in fluid communication with the water injection needle 15.

Figure 7:
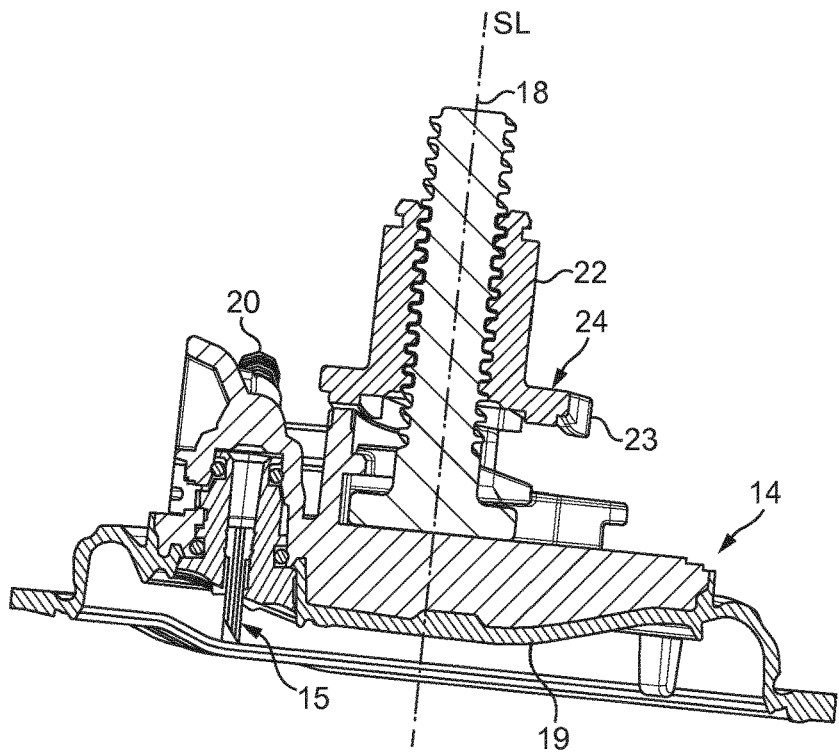
FIG. 7 is a cut view along the plane B-B of FIG. 6.

As shown in FIG. 7, a screw shaft 18 is attached by its so-called "proximal end" to the movable cavity part 14. The other end of the screw shaft 18 (i.e. the "distal" end) is free.

Figure 8:
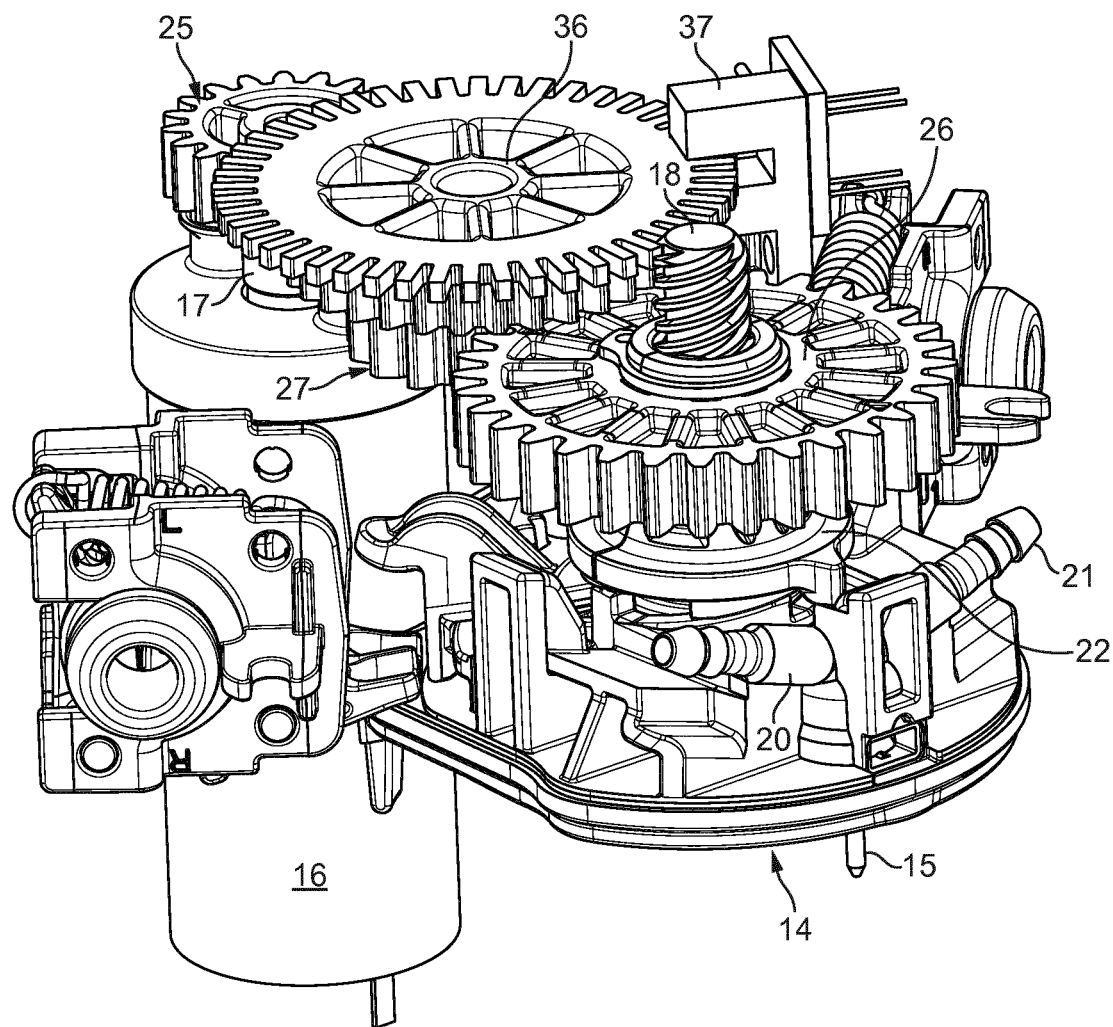
FIG. 8 is a perspective view of the brewing unit according to the invention without the internal chassis, capsule holder nor fluid pipes, hence illustrating the arrangement of the motor, gears, shaft, movable cavity part and peristaltic valve modules.
Figure 9A:
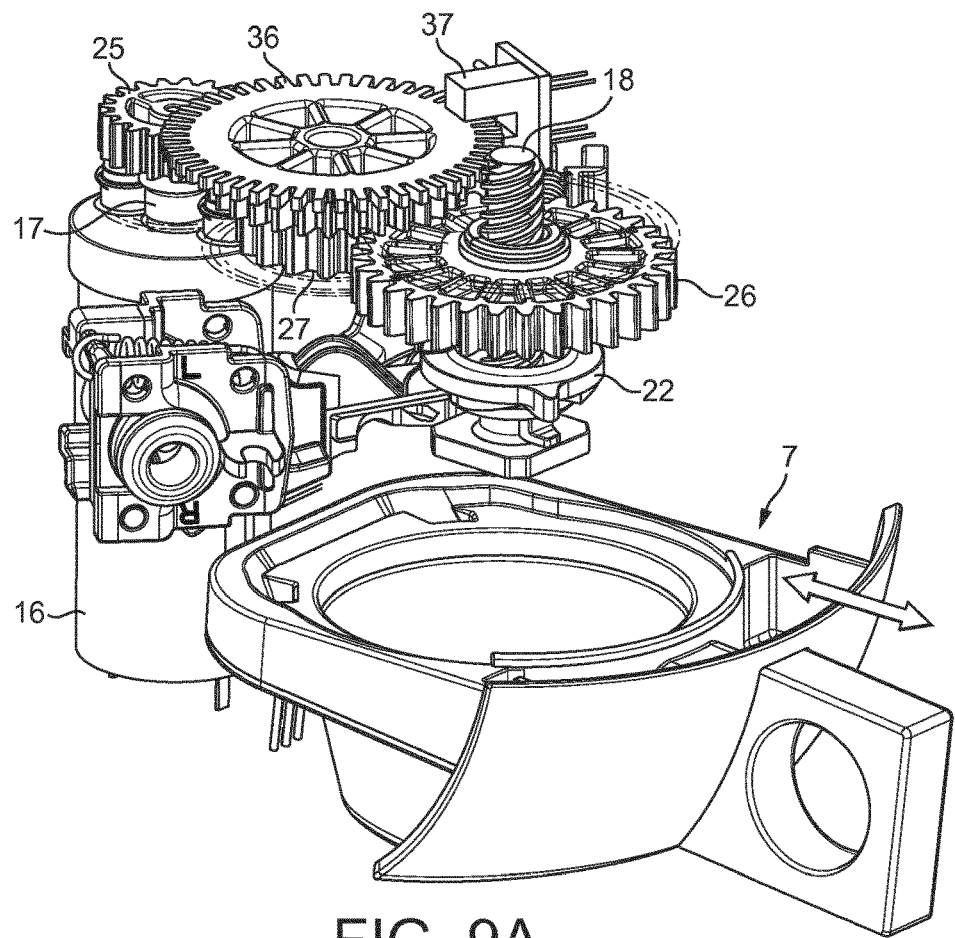
FIG. 9A is a view similar to FIG. 8, without the movable cavity part, showing the insertion of the capsule holder relative to the other elements of the brewing unit, wherein the screw shaft is positioned in its high position.
Figure 9B:
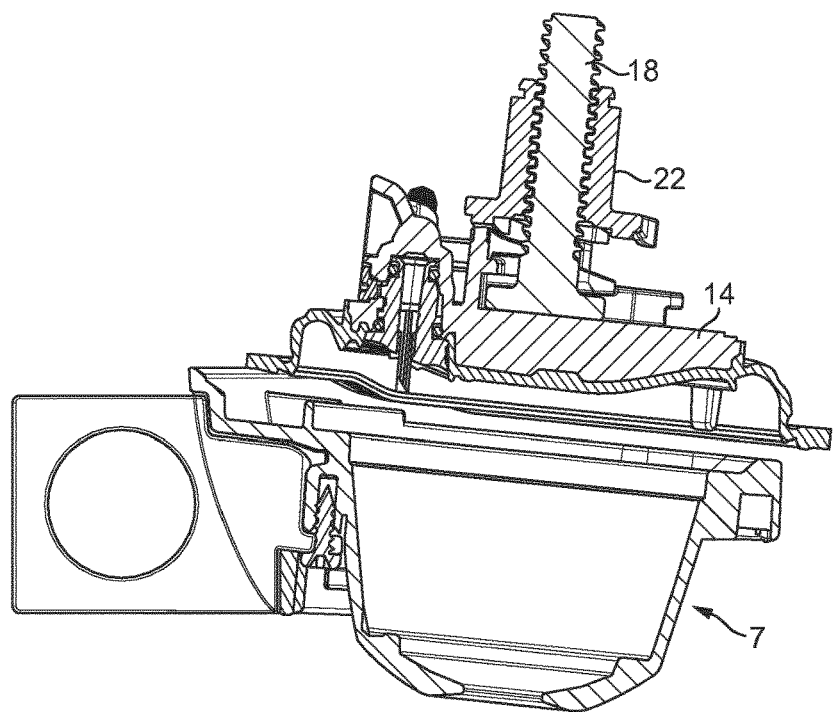
FIG. 9B is a cut view along C-C of FIG. 9A.
Figure 9C:
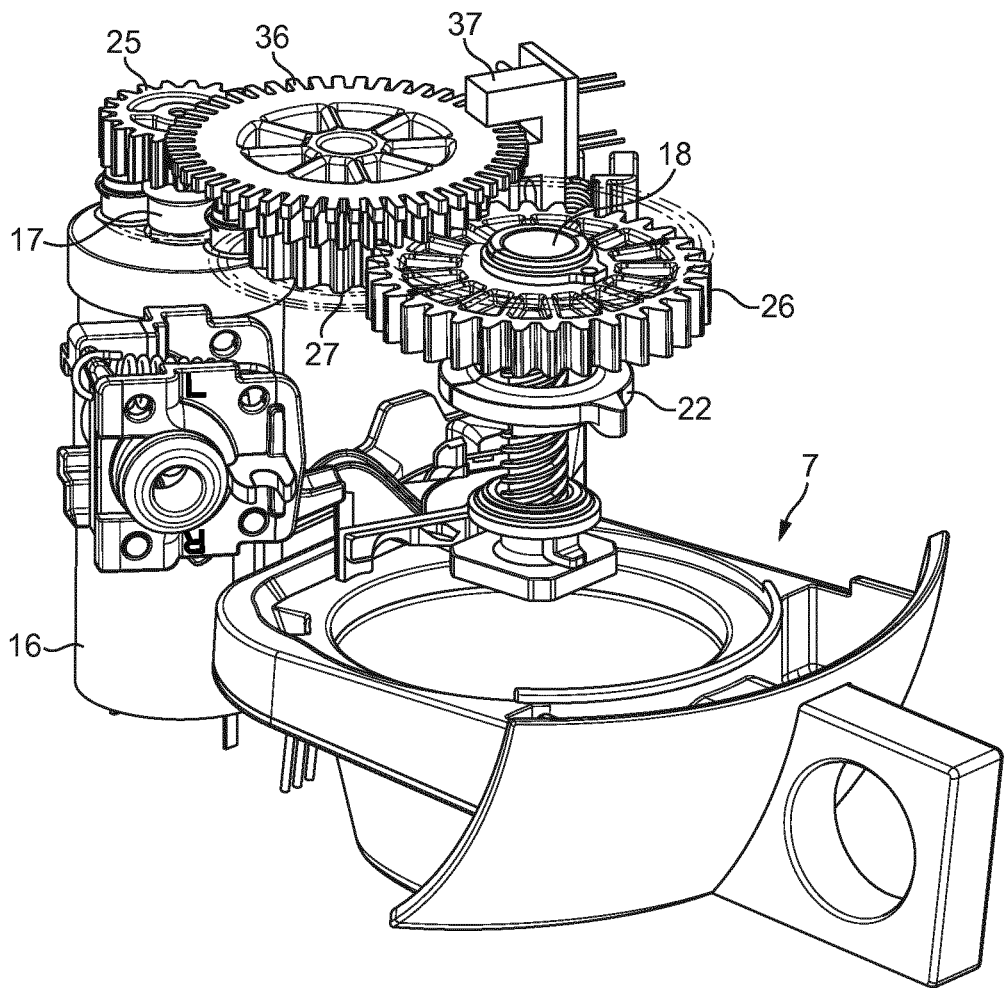
FIG. 9C is a view similar to FIG. 9A with the screw shaft in the low position.
Figure 10:
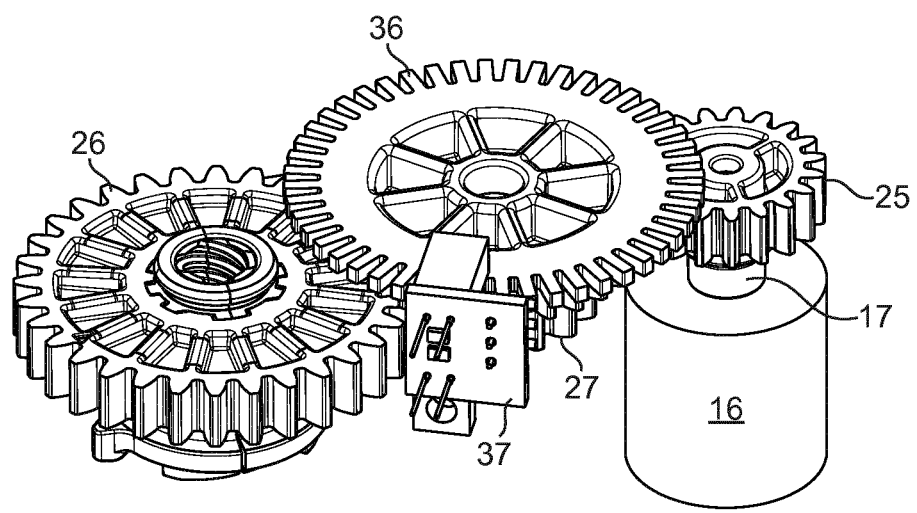
FIG. 10 is a perspective view of the motor, gear and screw shaft arrangement in an embodiment according to the invention.

The brewing unit further comprises a motor 16, illustrated in FIGS. 8, 9 and 10. Said motor has an output shaft 17.

As shown for instance in FIGS. 6 and 7, the brewing unit according to the invention also comprises a screw nut 22 movable in rotation along a thread path of screw shaft 18 in a translation shaft arrangement. The screw nut 22 is mechanically linked to the motor output shaft 17 such that when said nut 22 is rotated by the motor, it imparts a translation movement to the screw shaft 18, and therefore, to the movable cavity part 14 relative to the rest of the brewing unit. As shown in FIGS. 6 and 7, the screw nut 22 comprises a first catching means which is a protrusion 23 extending from its peripheral edge 24. The function of the first catching means will be described in more detail hereafter.

The output shaft of the motor and the screw nut are mechanically linked through a gear shaft assembly. As illustrated in FIGS. 8, 9A, 9B, 9C and 10, the gear shaft assembly comprises a motor gear wheel 25 fixed to the motor output shaft 17, and a drive gear wheel mounted onto the screw shaft 18. The drive gear wheel 25 is fixedly attached to the screw nut 22 so that they both rotate around the screw shaft 18 simultaneously. The motor gear wheel 25 is smaller than the screw shaft gear wheel 26. Furthermore, in the embodiment illustrated in FIG. 8, the motor gear wheel 25 and the screw shaft gear wheel 26 are linked by an intermediate speed reduction gear wheel 27 that comprises two bearing of various diameters, so as to achieve a reductor gear between the motor and the screw shaft. The characteristics and dimension ratios in the gear arrangement of the present embodiment are as follows:

Motor gear to intermediate gear wheel ~1/1.6

Intermediate gear wheel to drive gear wheel=½

The brewing unit also comprises a peristaltic fluid valve 28 for conducting or blocking one or another fluid (e.g. hot/cold water) from the machine towards said injection means through two flexible pipes corresponding to each of the two fluid sources. The peristaltic valve is represented in FIGS. 11 to 14B.

The peristaltic valve comprises two modules 28A and 28B, each of which is adapted around a corresponding flexible pipe 29A and 29B. Each peristaltic valve module comprises a mobile jaw 30 for pinching the corresponding pipe. In the embodiment represented in the figures, especially in FIGS. 11 to 14B, the peristaltic valve module 28A encloses a portion of the pipe that conducts hot water, whereas the peristaltic valve module 28B encloses a portion of the pipe that conducts cold water. Each module 28A, 28B further comprises:

a closing rocker body 31 for pressing said jaw 30 onto the pipe and closing it, when said closing rocker body 31 is pressed in a direction substantially parallel to the screw shaft 18, and an opening rocker body 32 for moving said jaw 30 away from said pipe so as to open it, when said opening rocker body 32 is pressed in a direction substantially parallel to the screw shaft 18.

Furthermore, each module 28A, 28B comprises a spring that forces the closing rocker body 31 in the closing position (i.e. so that the jaw 30 presses onto said tube) when no rocker body is actuated, such that when no pressure is applied to the rocker bodies, the jaw presses onto the corresponding pipe sufficiently to prevent fluid circulation therethrough, if the fluid pressure within said pipe is below a predetermined safety pressure lower than 3 bar, preferably lower than 2 bar.

The brewing unit according to the invention further comprises a preselector 33.

The preselector 33 comprises a rigid element pivotable between two angular positions around an axis which is the same as the longitudinal axis of the screw shaft 18. The preselector 33 comprises first and second actuating pins 34A, 34B, each pin extending from the rigid element towards a valve module, as shown for instance in FIGS. 11, 12 and 13. According to this configuration, the peristaltic valve can be set to two positions, as follows.

Figure 11:
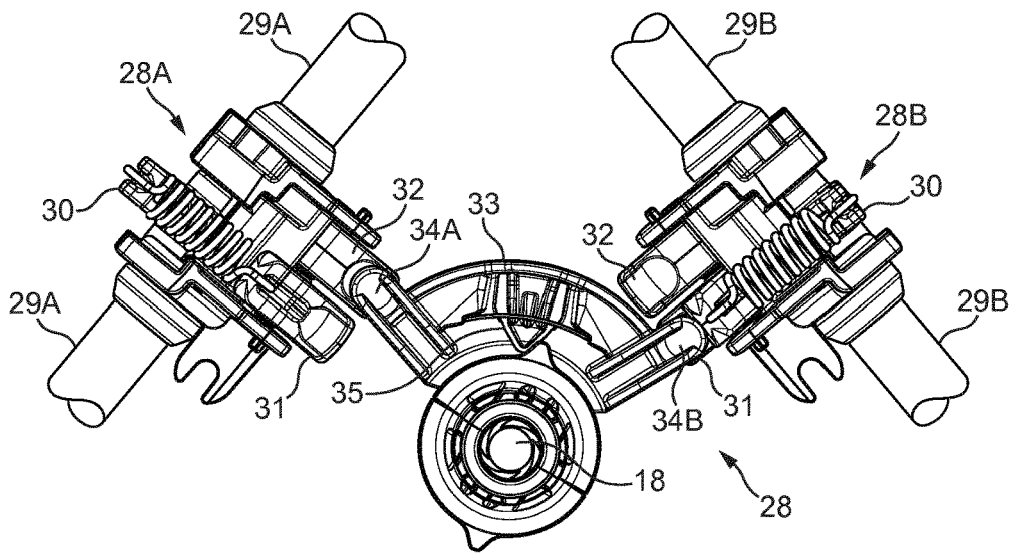
FIG. 11 is a top view of the preselector and peristaltic valve modules arrangement, with the preselector in its first position and the screw nut in the "reset" position.

In the first position of the preselector 33 illustrated in FIG. 11, the first actuating pin 34A overlaps the opening rocker body 32 of the first module 28A in a plane perpendicular to the screw shaft 18, while simultaneously the second actuating pin 34B overlaps the closing rocker body 31 of the second module 28B in a plane perpendicular to the screw shaft 18. In this position, when the pump of the beverage preparation machine is started, the cold water pipe is closed and the hot water pipe is open such that hot water is conducted from the reservoir 3, through the water heating element and water pipes, towards the water injection needle 15. Such a position of the peristaltic valve is required for preparing hot beverages such as coffee for instance.

Figure 12:
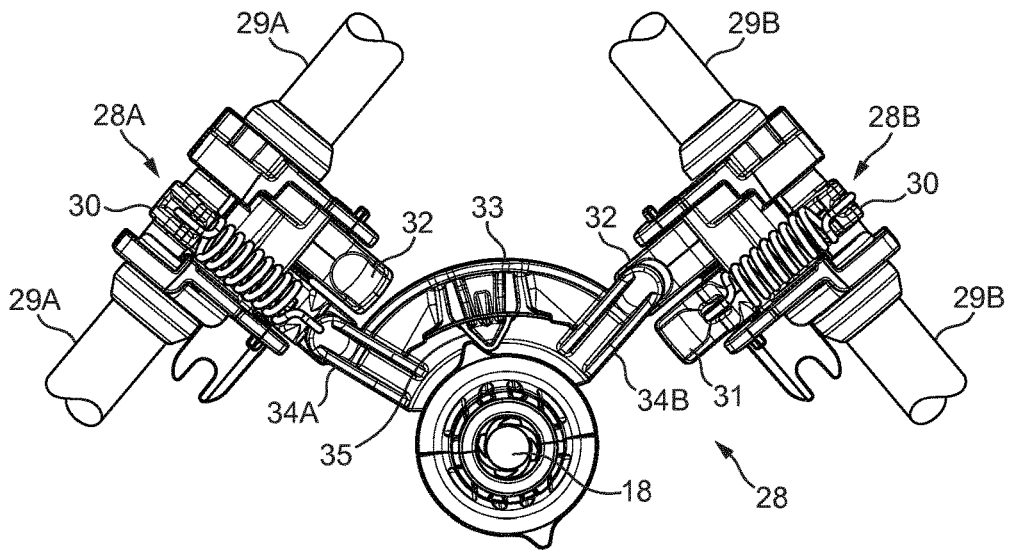
FIG. 12 is a view similar to FIG. 11, with the preselector in its second position.
Figure 13:
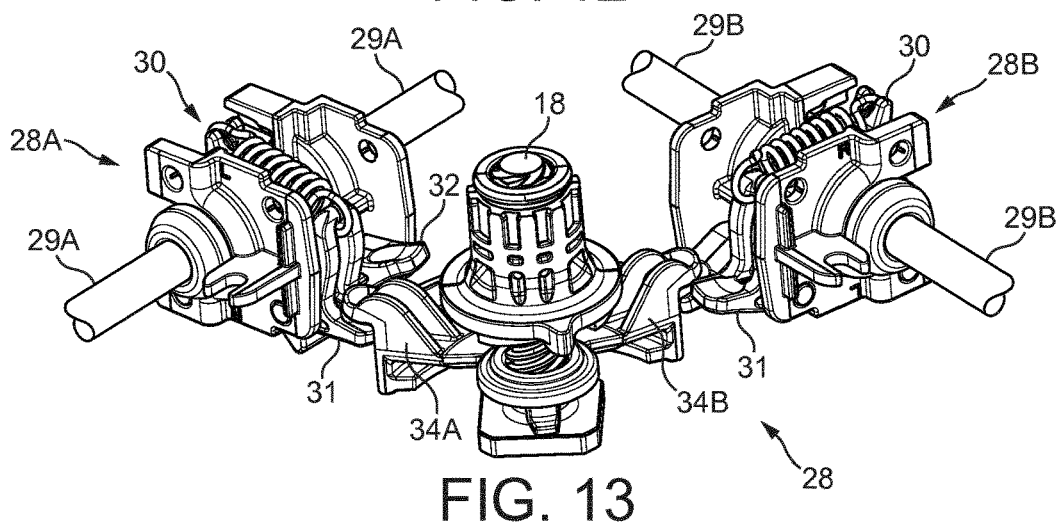
FIG. 13 is a perspective view similar to FIG. 12.
Figure 14A:
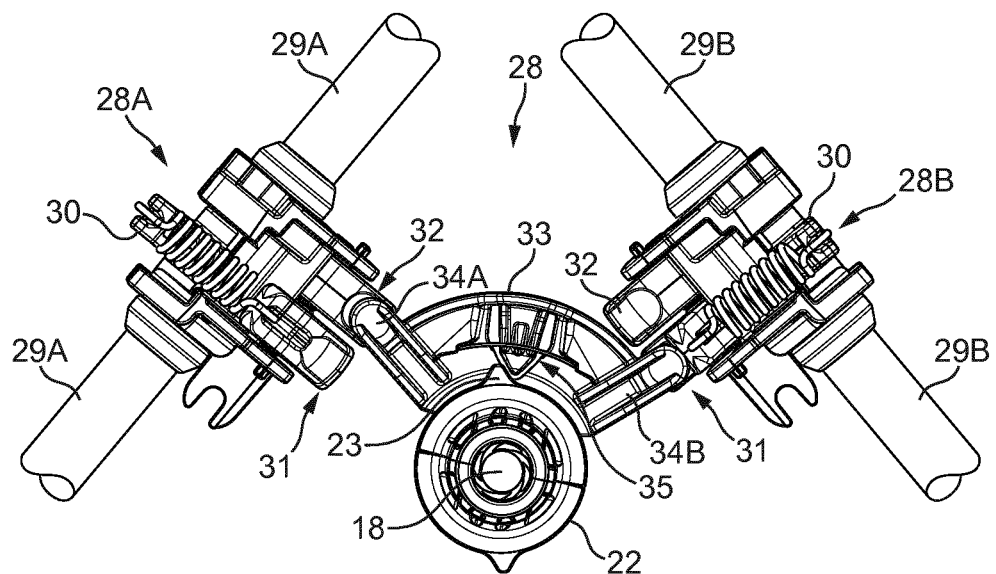
FIG. 14A is a top view similar to FIG. 11 with the screw nut in the drive position.
Figure 14B:
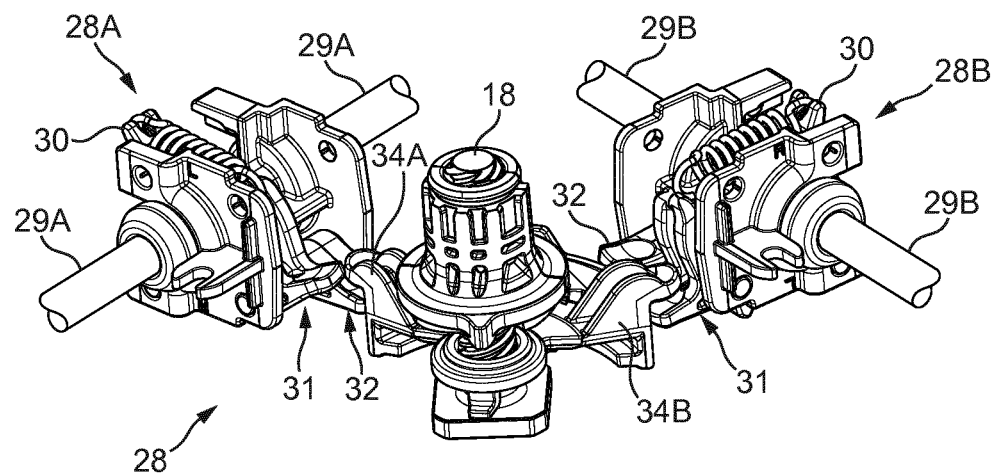
FIG. 14B is a perspective view similar to FIG. 14A.

In the second position of the preselector 33 illustrated in FIG. 12, the first actuating pin 34A overlaps the closing rocker body 31 of the first module 28A in a plane perpendicular to the screw shaft 18, while simultaneously the second actuating pin 34B overlaps the opening rocker body 32 of the second module 28B in a plane perpendicular to the screw shaft 18. In this position, when the pump of the beverage preparation machine is started, the hot water pipe is closed and the cold water pipe is open such that cold water is conducted from the reservoir 3, through water pipes, towards the water injection needle 15. Such a position is required for preparing cold beverages. By "cold", it is mentioned temperature which is the temperature of the water within the water reservoir of the machine. Generally, such so-called "cold" water is at room temperature.

Similarly to the screw nut 22 which comprises a first catching means in the form a protrusion 23 having a generally triangular shape and extending outwardly from the peripheral edge of said nut, the preselector 33 comprises a second catching means which is a spring-mounted protrusion or a flexible tongue 35 extending from the surface of said rigid element so as to be able to catch the screw nut protrusion 23 at a point along the thread path that is distant from the extremities of said path by at least $\frac{1}{16}$th of a nut rotation, in order to form a reversible ratchet arrangement. The flexibility of the tongue is adjusted such that the ratchet force is sufficient for pivoting the preselector element between its two angular positions, but insufficient for stopping the rotation of the screw nut further along the screw shaft during its rotation around the screw shaft, when the motor is running.

In any case, the catch point between the preselector tongue 35 and the protrusion 23 of the screw nut 22, is located at a distance comprised between $\frac{1}{16}$th and $\frac{1}{4}$th of a screw nut rotation, from the proximal extremity (or proximal end) of the screw shaft 18. This allows the screw nut 22 to continue its rotation further after said screw nut has caught the preselector tongue and driven said preselector in rotation to one of its two positions, such that by rotating further, the screw nut can separate (i.e. unhook) easily from the tongue of the preselector, and rotate further so that the movable cavity part can also move further in one or the other direction.

The preselector element is pivotable between two angular position around an axis parallel to, or coaxial with, the screw shaft longitudinal axis (SL). The two positions of the preselector are distant from one another by pivoting said preselector around its rotation axis of an angle comprised between 3° and 45°, preferably an angle comprised between 5° and 20°. Advantageously, the rotation axis of the preselector is merged with the longitudinal axis of the screw shaft.

At the beginning of each and every machine start, in order to ensure that the same valve position is selected (which by default in the preferred embodiment is the "hot water" position because most of the beverages prepared by consumers are hot beverages), said machine is programmed such that when it is turned on, the motor actuates the brewing unit gears so as to rotate the screw nut in its position where it is closest to the proximal end of the screw shaft (i.e. when the movable cavity is at its uppermost position), as illustrated in FIG. 9A. In this position also illustrated in FIG. 11, the screw nut 22 rotates the preselector 33 in its position where the actuating pins 34A and 34B are aligned to simultaneously:

press onto closing rocker body 31 of the peristaltic valve module mounted on the cold water pipe, to block the flow of cold water towards the injection needle 15, and press onto the opening rocker body 32 of the peristaltic valve module mounted on the hot water pipe, to allow hot water to circulate.

As illustrated in FIGS. 8, 9A, 9C and 10, the brewing unit further comprises an encoder wheel 36 and a sensor 37 mechanically linked to the output shaft 17 of the motor 16, for detecting the exact angular position of the screw nut 22 along the screw shaft 18. Such a mechanism allows to finely determine the position of the different movable parts of the brewing unit, in particular the position of the screw nut across the screw shaft. Depending on the position of the screw nut, the state of the fluid valve (closed, selection of "hot" water, selection of "cold/ambient" water) is known and controlled by the electronic control board of the beverage preparation machine. The encoder wheel 36 and sensor 37 preferably take the form of an optical encoder, as illustrated in FIG. 10.

The optical encoder is a light barrier disc with increment teeth. It can be an incremental encoder, but is preferably an absolute encoder that keeps in memory the extreme positions of the movable cavity part of the brewing unit, such that in case of unexpected shutdown of the brewing unit, it will automatically detect the position of the movable cavity part at the next system wake-up, and will actuate the motor to place the brewing unit in open position for a new use, if necessary. By default, the most remote position of the movable cavity part relative to the other cavity part is memorized in the control board of the brewing unit, as well as the position of said movable cavity part in contact to the other cavity part (i.e. in a closed configuration of the brewing unit cavity. Between these two extreme positions of the movable cavity part, the movement of the mechanic is electronically tracked on every position from top till down which closes the brewing unit. As a principle, the optical encoder's disc is made of glass or plastic with transparent and opaque areas. As illustrated in FIG. 8, these areas take the form of teeth disposed on the periphery of the encoder disc. Each tooth blocks the light emitted by a diode of a photo detector, while each gap between adjacent teeth lets light through, which is detected by the light sensor of the photo detector For this purpose, the diode and the light sensor of the photo detector are each disposed on a different side of the encoder disc. In an alternative embodiment, the disc can be covered with a light reflective material, such that light is sensed by the light sensor when a tooth faces said sensor (reflective principle contrary to the transmission principle described above). The light sensor of the photo detector reads the optical pattern that results from the encoder disc's position at any one time, which is translated by a micro-controller or microprocessor into the angular position of the main transmission shaft, that gives a precise indication of all of the position of the elements of the gear mechanism, i.e. the output shaft of the motor, the gear wheels, the main transmission shaft, and therefore precise the position of the movable cavity part of the brewing unit between its closed and its fully open positions. In alternative equivalent embodiments, the optical encoder described above can be replaced by a mechanical, a magnetic, or a capacitive encoder.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A brewing unit for a beverage preparation machine, the beverage preparation machine comprising a first fluid source, a first flexible pipe, a second fluid source alternative to the first fluid source, and a second flexible pipe, the brewing unit comprising cavity parts forming together a cavity for receiving an ingredient, the cavity parts comprising a movable cavity part configured to move relative to at least one of the other cavity parts to open or close the cavity, the brewing unit comprising an injector configured for injecting into the cavity a first fluid distributed through the first flexible pipe from the first fluid source or a second fluid distributed through the second flexible pipe from the second fluid source, to mix the first fluid or the second fluid with the ingredient and produce a beverage, the brewing unit further comprises:
a motor having an output shaft;
a screw shaft comprising a proximal extremity fixed to the movable cavity part;
a screw nut movable in rotation along a thread path of the screw shaft in a translation shaft arrangement, the screw nut being mechanically linked to the output shaft of the motor such that when the screw nut is rotated by the motor, the screw nut imparts a translation movement to the screw shaft and the movable cavity part relative to the rest of the brewing unit, the screw nut comprising a protrusion or groove extending from, or respectively into, a peripheral edge of the screw nut;
a peristaltic fluid valve configured for selectively conducting one of the first and second fluids through the corresponding flexible pipe toward the injector while blocking the other one of the first and second fluids in the corresponding flexible pipe from the injector,
the peristaltic valve comprising first and second modules, the first module is positioned around the first flexible pipe and comprises a first mobile jaw configured for pinching the first flexible pipe, the first module comprising a first closing rocker body configured for pressing the first mobile jaw onto the first flexible pipe to close the first flexible pipe when the first closing rocker body is pressed in a direction substantially parallel to the screw shaft, the first module further comprising a first opening rocker body configured for moving the first mobile jaw away from the first flexible pipe when the first opening rocker body is pressed in a direction substantially parallel to the screw shaft to open the first flexible pipe,
the second module is positioned around the second flexible pipe and comprises a second mobile jaw configured for pinching the second flexible pipe, the second module comprising a second closing rocker body configured for pressing the second mobile jaw onto the second flexible pipe to close the second flexible pipe when the second closing rocker body is pressed in a direction substantially parallel to the screw shaft, the second module further comprising a second opening rocker body configured for moving the second mobile jaw away from the second flexible pipe when the second opening rocker body is pressed in a direction substantially parallel to the screw shaft to open the second flexible pipe; and
a preselector comprising:
a rigid element pivotable between first and second angular positions and comprising first and second actuating pins, the first actuating pin extending towards the first module of the peristaltic valve and the second actuating pin extending towards the second module of the peristaltic valve such that, in the first position of the preselector, the first actuating pin overlaps the first opening rocker body in a plane perpendicular to the screw shaft while the second actuating pin overlaps the second closing rocker body in a plane perpendicular to the screw shaft, and in the second position of the preselector, the first actuating pin overlaps the first closing rocker body in a plane perpendicular to the screw shaft while the second actuating pin overlaps the second opening rocker body in a plane perpendicular to the screw shaft; and
a flexible tongue extending from the rigid element to catch the protrusion or groove of the screw nut at a point along the thread path that is distant from the proximal extremity and a distal extremity of the thread path by at least $1/16^{th}$ of a rotation of the screw nut to form a reversible ratchet arrangement that provides a ratchet force sufficient for pivoting the rigid element between the first and second angular positions but insufficient for stopping the rotation of the screw nut further along the screw shaft during the rotation of the screw nut.

2. The brewing unit according to claim 1, wherein the output shaft of the motor and the screw nut are mechanically linked to each other through a belt assembly.

3. The brewing unit according to claim 1, wherein the point at which the preselector tongue catches the protrusion or groove of the screw nut is located at a distance between $1/16^{th}$ and $1/4^{th}$ of a rotation of the screw nut from the proximal extremity of the screw shaft.

4. The brewing unit according to claim 1, wherein an entirety of the brewing unit is detachable from a body of the beverage preparation machine.

5. The brewing unit according to claim 1, wherein the cavity is configured to receive a single-dose disposable package in which the ingredient is contained.

6. The brewing unit according to claim 1, wherein one of the first and second two fluid sources is configured to provide cold or ambient water drawn from a reservoir of the beverage preparation machine, and the other one of the first and second fluid sources is configured to provide hot water drawn from the same reservoir and treated through a water heater.

7. The brewing unit according to claim 1, wherein each of the first and second mobile jaws is spring-mounted such that when no pressure is applied to the corresponding one of the first and second rocker bodies, the corresponding one of the first and second mobile jaws presses onto the corresponding one of the first and second flexible pipes sufficiently to prevent fluid circulation therethrough if fluid pressure within the corresponding one of the first and second flexible pipes is below a predetermined safety pressure lower than 3 bar.

8. The brewing unit according to claim 1, wherein the rigid element is pivotable between the first and second angular positions around an axis parallel to and/or coaxial with a longitudinal axis of the screw shaft.

9. The brewing unit according to claim 1, comprising an encoder wheel and a sensor mechanically linked to the output shaft of the motor, configured for detecting an exact angular position of the screw nut along the screw shaft.

10. The brewing unit according to claim 9, wherein the encoder wheel is a light barrier wheel with increment teeth.

11. The brewing unit according to claim 1, wherein the output shaft of the motor and the screw nut are mechanically linked to each other through a gear shaft assembly.

12. The brewing unit according to claim 11, wherein the gear shaft assembly comprises at least a motor gear wheel fixed to the output shaft of the motor, and the gear shaft assembly further comprises a drive gear wheel fixed to the screw shaft, the motor gear wheel being smaller than the drive gear wheel.

13. The brewing unit according to claim 12, wherein the gear shaft assembly further comprises a speed reduction gear wheel intermediate between the motor gear wheel and the drive gear wheel.

14. A beverage preparation machine comprising:
a first fluid source;
a first flexible pipe;
a second fluid source alternative to the first fluid source;
a second flexible pipe; and
a brewing unit comprising:
cavity parts forming together a cavity for receiving an ingredient, the cavity parts comprising a movable cavity part configured to move relative to at least one of the other cavity parts to open or close the cavity, the brewing unit comprising an injector configured for injecting into the cavity a first fluid distributed through the first flexible pipe from the first fluid source or a second fluid distributed through the second flexible pipe from the second fluid source, to mix the first fluid or the second fluid with the ingredient and produce a beverage;
a motor having an output shaft;
a screw shaft comprising a proximal extremity fixed to the movable cavity part;
a screw nut movable in rotation along a thread path of the screw shaft in a translation shaft arrangement, the screw nut being mechanically linked to the output shaft of the motor such that when the screw nut is rotated by the motor, the screw nut imparts a translation movement to the screw shaft and the movable cavity part relative to the rest of the brewing unit, the screw nut comprising a protrusion or groove extending from, or respectively into, a peripheral edge of the screw nut;
a peristaltic fluid valve configured for selectively conducting one of the first and second fluids through the corresponding flexible pipe toward the injector while blocking the other one of the first and second fluids in the corresponding flexible pipe from the injector,
the peristaltic valve comprising first and second modules, the first module is positioned around the first flexible pipe and comprises a first mobile jaw configured for pinching the first flexible pipe, the first module comprising a first closing rocker body configured for pressing the first mobile jaw onto the first flexible pipe to close the first flexible pipe when the first closing rocker body is pressed in a direction substantially parallel to the screw shaft, the first module further comprising a first opening rocker body configured for moving the first mobile jaw away from the first flexible pipe when the first opening rocker body is pressed in a direction substantially parallel to the screw shaft to open the first flexible pipe,
the second module is positioned around the second flexible pipe and comprises a second mobile jaw configured for pinching the second flexible pipe, the second module comprising a second closing rocker body configured for pressing the second mobile jaw onto the second flexible pipe to close the second flexible pipe when the second closing rocker body is pressed in a direction substantially parallel to the screw shaft, the second module further comprising a second opening rocker body configured for moving the second mobile jaw away from the second flexible pipe when the second opening rocker body is pressed in a direction substantially parallel to the screw shaft to open the second flexible pipe; and
a preselector comprising:
a rigid element pivotable between first and second angular positions and comprising first and second actuating pins, the first actuating pin extending towards the first module of the peristaltic valve and the second actuating pin extending towards the second module of the peristaltic valve such that, in the first position of the preselector, the first actuating pin overlaps the first opening rocker body in a plane perpendicular to the screw shaft while the second actuating pin overlaps the second closing rocker body in a plane perpendicular to the screw shaft, and in the second position of the preselector, the first actuating pin overlaps the first closing rocker body in a plane perpendicular to the screw shaft while the second actuating pin overlaps the second opening rocker body in a plane perpendicular to the screw shaft; and
a flexible tongue extending from the rigid element to catch the protrusion or groove of the screw nut at a point along the thread path that is distant from the proximal extremity and a distal extremity of the thread path by at least $\frac{1}{16}^{th}$ of a rotation of the screw nut to form a reversible ratchet arrangement that provides a ratchet force sufficient for pivoting the rigid element between the first and second angular positions but insufficient for stopping the rotation of the screw nut further along the screw shaft during the rotation of the screw nut.

15. The beverage preparation machine according to claim 14, wherein an entirety of the brewing unit is detachable from a body of the beverage preparation machine.

16. The beverage preparation machine according to claim 14, wherein one of the first and second fluid sources is configured to provide cold or ambient water drawn from a reservoir of the beverage preparation machine, and the other one of the first and second fluid sources is configured to provide hot water drawn from the same reservoir and treated through a water heater.

* * * * *